Figure 1:
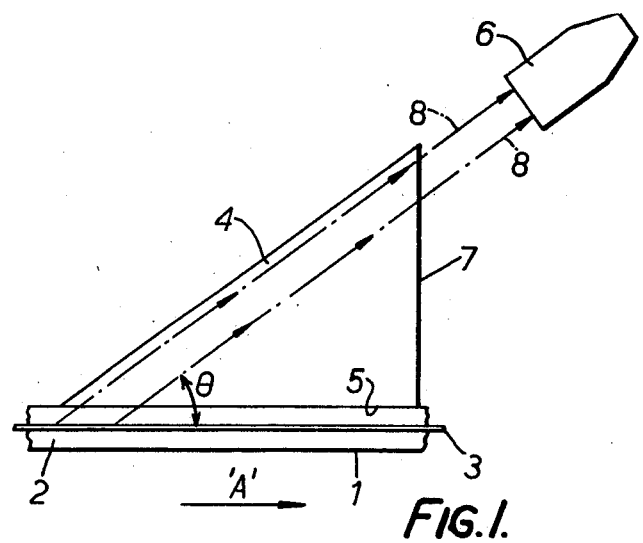

United States Patent [19]

Stewart

[11] 4,102,579
[45] Jul. 25, 1978

[54] OPTICAL APPARATUS

[75] Inventor: William James Stewart, Towcester, England

[73] Assignee: Plessey Handel und Investments A.G., Zug, Switzerland

[21] Appl. No.: 629,608

[22] Filed: Nov. 6, 1975

[30] Foreign Application Priority Data

Nov. 8, 1974 [GB] United Kingdom ............... 48337/74

[51] Int. Cl.² .............................................. G02B 27/00
[52] U.S. Cl. .................. 356/201; 350/96.10; 356/256
[58] Field of Search ............... 350/96 C; 356/201, 256

[56] References Cited

U.S. PATENT DOCUMENTS

| 3,311,845 | 3/1967 | Koester | 350/96 WG |
| 3,584,230 | 6/1971 | Tien | 350/96 WG |
| 3,617,109 | 11/1971 | Tien | 350/96 WG |
| 3,777,149 | 12/1973 | Marcatili | 350/96 C |
| 3,936,142 | 2/1976 | Kersten | 350/96 C |

OTHER PUBLICATIONS

Snyder et al., "Leaky Rays on Circular Optical Fibers", JOSA vol. 64, No. 5, (May 1974), pp. 599–607.
Snyder et al. "Failure of Geometric Optics for Analysis of Circular Optical Fibers", JOSA vol. 65, No. 5 (May 1974), pp. 608–614.

*Primary Examiner*—John K. Corbin
*Assistant Examiner*—R. A. Rosenberger
*Attorney, Agent, or Firm*—Fleit & Jacobson

[57] ABSTRACT

An optical apparatus for use in association with an optical fibre having a core member and a cladding member which surrounds the core member and which has a refractive index less than the refractive index of the core member, the apparatus including optical means adapted to examine light radiated at an angle through the cladding member and thereby determine the characteristics of the optical fibre and/or facilitate the application of an illuminating beam of light at an angle through the cladding member and to thereby excite a single mode in the optical fibre; and means for maintaining the angle between the light and the fibre axis substantially constant.

12 Claims, 13 Drawing Figures

U.S. Patent    July 25, 1978    Sheet 1 of 3    4,102,579

OPTICAL APPARATUS

The invention relates to optical apparatus for use in association with optical fibres.

Optical fibres having a core member and a cladding member which surrounds the core member and which has a refractive index $n_2$ less than the refractive index of the core member, are primarily used for the transmission of information by systems operating at frequencies above $10^{14}$ Hz. To be effective, an optical fibre operating at these frequencies must be able to transmit light without excessive attenuation and should not cause dispersion or scattering of the transmitted light. Furthermore, the optical fibre should allow only preselected modes of light to propagate therealong although, in some instances, it may be advantageous for the optical fibre to be such that a number of modes can propagate therealong. Optical fibres of this type are unique in that many of the physical charactersitics and parameters of the fibres must be carefully controlled during the production process and present methods of measuring the bandwidth and the so called "V" value of an optical fibre are destructive methods and cannot, therefore, be used as a monitoring technique during optical fibre production. Furthermore, the known destructive methods of measuring the bandwidth of an optical fibre are very cumbersome.

The "V" value is given by the following equation.

$$V = (2\pi a/\lambda)\sqrt{(n_0+n_2)(n_0-n_2)}$$

where
- $a$ = core radius of the waveguide
- $\lambda$ = wavelength of the light to be transmitted
- $n_0$ = maximum refractive index of core member
- $n_2$ = refractive index of cladding member.

Also, at the present time, the provision of a high speed multiway fibre optic switch or a single fibre high speed modulator in integrated optical devices or the like gives rise to practical difficulties but these difficulties could be considerably reduced if it were possible to be able to non-destructively excite fibre modes in an optical fibre.

The invention provides an optical apparatus for use in association with an optical fibre having a core member and a cladding member which surrounds the core member and which has a refractive index less than the refractive index of the core member, the apparatus including optical means adapted to examine light radiated at an angle through the cladding member and thereby determine the characteristics of the optical fibre and/or facilitate the application of an illuminating beam of light at an angle through the cladding member and to thereby excite a single mode in the optical fibre; and means for maintaining the angle between the light and the fibre axis substantially constant.

Figure 2:
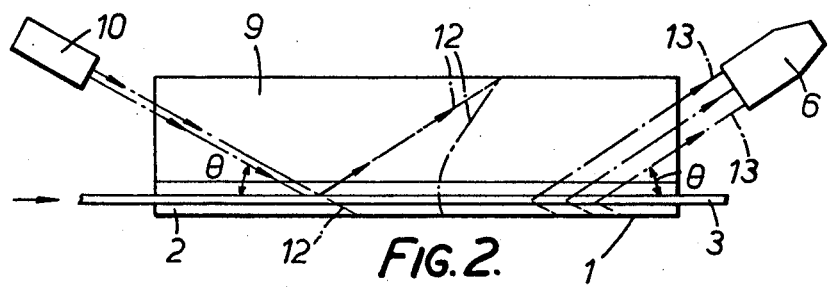
Figure 3:
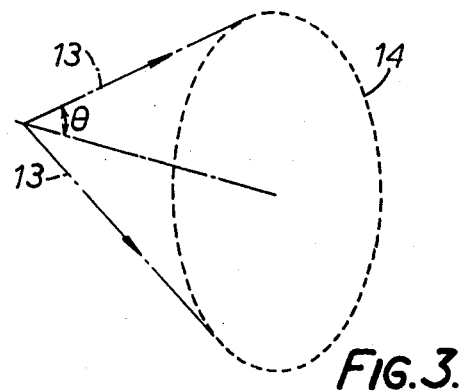

The foregoing and other features according to the invention will be better understood from the following description with reference to the accompanying drawings in which:

FIG. 1 diagrammatically illustrates in a plan view one arrangement for an optical apparatus according to the invention, FIG. 2 diagrammatically illustrates in a plan view another arrangement for an optical apparatus according to the invention, FIG. 3 diagrammatically illustrates in a pictorial view a cone of leakage radiation associated with the apparatus of FIG. 2, and FIGS. 4 to 13 diagrammatically illustrate alternative arrangements for the optical apparatus according to the invention.

An optical apparatus according to the invention which can be used to non-destructively measure the propagation constants of the optical fibre modes in an optical fibre having a core member and a cladding member which surrounds the core member and which has a refractive index less than the refractive index of the core member, is diagrammatically illustrated in a plan view in FIG. 1 of the drawings.

As is illustrated in FIG. 1, the optical apparatus includes a bath 1 containing an optically transparent liquid 2 through which an optical fibre 3 is passed during its production i.e. after being subjected to a drawing operation to reduce the cross-sectional area thereof. A solid prism 4 is secured to one side of the bath 1 in a manner such that a face 5 of the prism is in contact with the liquid 2. The optical fibre 3 is maintained in a parallel relationship with the face 5 of the prism during its passage through the liquid 2.

A telescope 6 or other optical system is situated adjacent to a face 7 of the prism 4 and is used to observe the light 8 radiated at an angle $\theta$ through the cladding member of the optical fibre 3.

In practice, the cladding member of the optical fibre 3 will, as previously stated, have a refractive index $n_2$ and the core member a peak refractive index $n_0$ which is greater than $n_2$ for most cases of practical interest. The liquid 2 and the prism 4 have refractive indices $n_3$ and $n_4$ respectively, and the value of $n_4$ would need to be known. The refractive indices $n_3$ and $n_4$ may be equal to each other and under these conditions the prism 4 could be replaced by an extension of the liquid bath. More information is obtained and the apparatus is practically simpler, if $n_3$ and $n_4$ are greater than $n_2$ and probably also greater than $n_0$, but there are no limits on the indices that could be used. However, indices smaller than $n_2$ cause severe practical difficulties.

The face 7 of the prism 4 need not be perpendicular to the longitudinal axis of the optical fibre 3, and could be curved to form part of the optical system.

When light is propagated along the core member of the optical fibre 3 in the direction of the arrow 'A', the light from any one mode is radiated through the cladding member of the optical fibre at an angle $\theta$ to the longitudinal axis of the optical fibre. The angle $\theta$ is simply related to the propagation constant of the associated mode, therefore, by measuring the angle $\theta$ of the radiated light 8 the propagation constant and thereby the V value may be accurately deduced.

The importance of this measurement technique is that the technique is non-destructive and that the resolution of propagation angle is much better i.e. by the ratio of the telescope aperture (several cm) to the fibre diameter (typically 100μm), than would be obtained by the known techniques of examining the light emerging from the end of the optical fibre. This change of resolution makes it possible to be able to satisfactorily resolve the fibre modes.

By propagating white light along the optical fibre 3 and by using suitable dispersive optics, the propagation constants of the modes may be measured as a function of wavelength. Since this ratio is the group velocity for the mode in question the fibre bandwidth may be deduced. By identifying the mode and measuring its propagation angle, the V value may be accurately deduced.

The optical apparatus outlined in preceding paragraphs can therefore be used to monitor the physical characteristics and parameters of an optical fibre whilst it is being produced on a fibre drawing rig. The liquid 2 in the bath 1 as well as being part of the optical system of the apparatus may also be used to provide a coating on the optical fibre as it is being drawn out of the bath 1. This coating may be subsequently hardened.

The refractive index $n_2$ of the cladding member of the optical fibre can be obtained by measuring the smallest observed angle $\theta$.

As a spot measuring technique it is possible to measure the numerical aperture (NA) of an optical fibre and use the optical apparatus according to the invention, and deduce all the other information, but it is not possible to monitor the NA directly with great accuracy without breaking the optical fibre. In order to monitor the NA it is, therefore, necessary to monitor the diameter of the optical fibre and deduce changes in the other parameters with the optical apparatus, the results obtained being calibrated with a single spot measurement afterwards. It is possible, but probably not practical, to avoid this by careful examination of the light from a single mode, hence identifying the mode. If the fibre diameter is not monitored, the V value can still be observed and monitored in a manner as previously outlined.

It is also possible with the optical apparatus according to the invention to observe changes in the cross-sectional symmetry of the optical fibre by making observations of the radiated light at various points around the fibre, but this data may be difficult to quantify.

The refractive index profile of the core member of the optical fibre can also be determined using the apparatus according to the present invention. With this arrangement, the prism 4 of the apparatus according to FIG. 1 of the drawings is, as is diagrammatically illustrated in a plan view in FIG. 2 of the drawings, replaced by a rectangular shaped prism 9 and a laser unit 10 is provided for applying a laser beam 11 to the optical fibre 3 at an angle $\theta$ to the longitudinal axis of the optical fibre.

The chain dotted lines 12 represent a cone of reflected laser light and the chain dotted lines 13 represent cones of light from any one mode that are radiated through the cladding member of the optical fibre at an angle $\theta$ to the longitudinal axis of the optical fibre. Since the angle at which the laser beam 11 enters the optical fibre is the same as the angle at which the cones of leakage radiation 13 radiate through the cladding member then that part of the laser beam 11 which enters the optical fibre 3 will, therefore, intensify the related propagating light mode in the optical fibre and also intensify the related cones of leakage radiation 13 thereby enabling the cones of leakage radiation 13 to be observed more clearly with the telescope 6 or other optical system.

A typical cone of leakage radiation is diagrammatically illustrated in a pictorial view in FIG. 3 of the drawings and it is known that the leakage radiation from a mode has the same azimuthal periodicity as the mode. The azimuthal periodicity of the leakage radiation cone of FIG. 3 which is represented by the broken line 14, can, therefore, be detected and measured by observing and/or recording the leaking radiation using the telescope 6 or other optical system. This will, therefore, give the azimuthal mode number $\nu$ (nu).

The angle $\theta$ of the leakage radiation can be used in association with the refractive index $n_3$ of the prism 9 to determine a value $\beta$ from the following equation:

$$\beta = n_3 \cos \theta$$

The value $\beta$ and the azimuthal mode number $\nu$ can then be used in a known manner to determine a value $\mu$ and thereby the refractive index profile of the core member of the optical fibre 3.

Alternatively, the $\mu$ and $\nu$ values could be determined from the field distribution at the fibre end if this is accessible, either during production of the optical fibre or by subsequent measurements.

Figure 4:
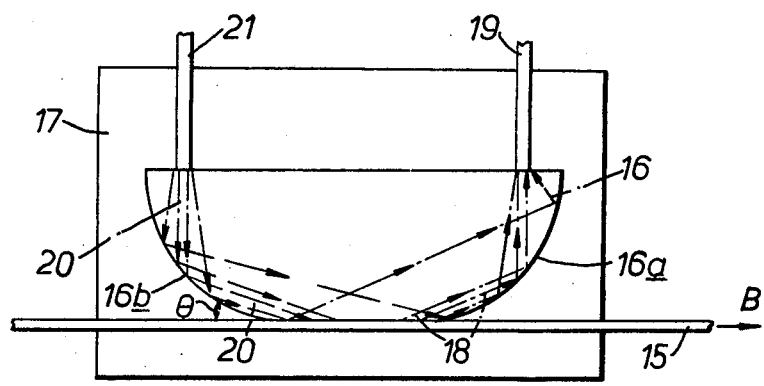

The optical apparatus outlined in preceding paragraph could, as is diagrammatically illustrated in FIG. 4 of the drawings in a plan view, also be used as a signal extraction device by having a length of optical fibre 15 secured in a fixed spaced relationship with an optical system 16, the fibre 15 and the system 16 being secured to a mounting plate 17 of a low loss plastics material such as perspex. The light information data to be extracted would be propagated along the fibre 15 in the direction of the arrow 'B' and the light 18 radiated through the fibre cladding would be detected by an optical fibre 19 or the like and displayed, using any suitable optical system.

The optical system 16 is in the form of a glass plate having curved surfaces 16a and 16b, the glass/air interface at the curved surfaces providing total reflection for any light radiation applied thereto.

The optical apparatus according to FIG. 4 could also be used to excite a single mode in the optical fibre 15 by the application of an illuminating beam of light 20 to the fibre 15 via an optical fibre 21 or the like and the prism 9 or the like so that the beam 20 impinges on the fibre 15 at the appropriate angle $\theta$, the beam 20 being deflected at the appropriate angle towards the fibre 15 by the glass/air interface at the curved surface 16b. This method of fibre mode excitation which is particularly suitable for coupling to integrated optic devices has distinct advantages in that the optical fibre does not have to be broken and as a result alignment problems are minimised, in that signals may be applied to an optical fibre without disturbing signals that are already propagating therealong, and in that the amount of power launched is extremely sensitive to the angle $\theta$ so that fibres with slightly different accepting $\theta$'s could be distinguished.

The mode excited in the optical fibre can be detected and displayed in a manner as previously outlined by means of the prism 9 and the optical fibre 19 or the like.

This arrangement of the optical apparatus could form the basis of a high speed multiway switch or, with a single fibre, of a high speed modulator. A laser unit would be required for generating the light beam because the angle $\theta$ would need to be well-defined.

It has been found experimentally that a reasonable coupling efficiency, i.e. of the order of 6%, can be obtained by using a He-Ne laser with an optical apparatus similar to the illustrated arrangement, the resultant light pattern being propagated over 1km of optical fibre.

Alternative arrangements of the optical apparatus according to the invention for use in high speed modulator systems are diagrammatically illustrated in FIGS. 5 to 11 of the drawings.

Figure 5:
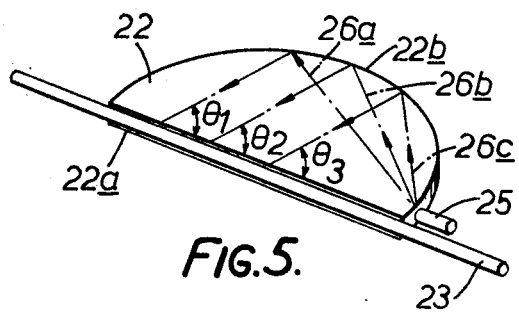

The optical apparatus according to FIG. 5 includes a suitably curved optical plate 22 having an optical fibre 23 secured to, and parallel with, a flat surface 22a of the plate 22. The plate 22 must be optically isolated so that light can be trapped therein. In practice, the plate 22 would be of glass and the optical isolation can be effected by diffusing ions into the glass, coating the glass plate with an opaque plastics material or holding the glass plate in a frame of a relatively low refractive index plastics material such as p.t.f.e.

The curved surface 22b of the plate 22 may be totally reflecting or suitably coated, for example, with a dichroic coating.

Figure 6:
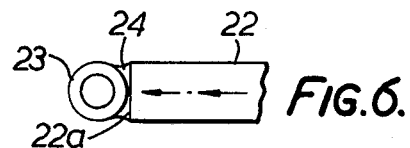

The optical fibre 23 is, as is diagrammatically illustrated in FIG. 6 in an enlarged cross-sectional side elevation of part of the apparatus of FIG. 5, secured to the surface 22a of the plate 22 by means of a refractive index matching material 24, for example, an epoxy base resin, which is interposed between the fibre 23 and the surface 22a.

An optical fibre 25 or the like is included for effecting the application of illuminating beams of light such as the beams 26a to 26c, to the fibre 23 via the prism 22. The light beams 26a to c impinge on the fibre 23 respectively at an angle $\theta_1$ to $\theta_3$ and will all excite the same mode or group of modes in the optical fibre 23.

The optical apparatus of FIGS. 5 and 6 utilizes a straight, undeformed optical fibre 23 and the coupling efficiency of this arrangement is not very great in the launched modes but could be satisfactory for some applications.

Figure 7:
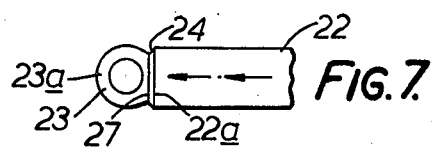
Figure 8:
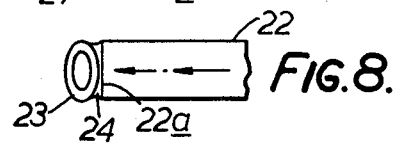

The coupling efficiency of the optical apparatus can, however, be increased by changing the shape of the optical fibre in a manner as is illustrated in FIGS. 7 and 8 of the drawings which are enlarged cross-sectional side elevations of part of the apparatus of FIG. 5.

As is illustrated in FIG. 7, a flat surface 27 is formed on the outersurface of the cladding member 23a of the optical fibre 23, the surface 27 is situated adjacent to, and is parallel with, the flat surface 22a of the prism 22. The flat surface 27 can be formed by either polishing or etching the outersurface of the cladding member 23a.

With the arrangement of FIG. 8, the optical fibre 23 is elliptically deformed in order to give increased coupling efficiency.

Figure 9:
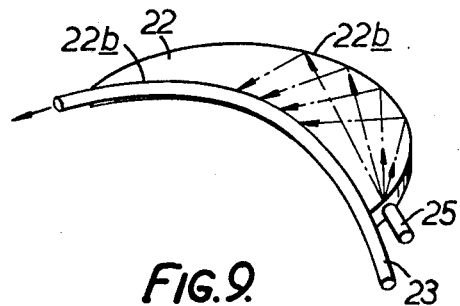

Alternatively, the coupling efficiency of the optical apparatus of FIG. 5 can, as is diagrammatically illustrated in a pictorial view in FIG. 9 of the drawings, be increased by providing a concave surface 22b on the prism 22 instead of a flat surface, bending the optical fibre 23 in the region of launch, securing the bent optical fibre 23 to the concave surface and arranging the optical system so that the angle between the exciting light beam for any particular mode and the curved fibre axis is substantially constant at all points in the region of launch.

Figure 10:
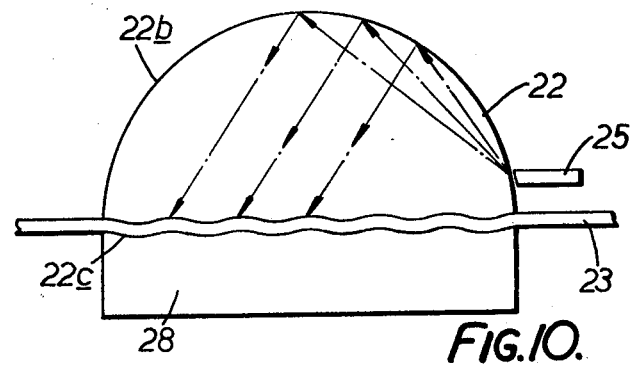

With the arrangement of FIG. 10 which diagrammatically illustrates an optical apparatus according to the invention in a plan view, the coupling efficiency of the apparatus of FIG. 5 can be increased by providing a regular undulating surface 22c on the prism 22 instead of a flat surface, pressing the optical fibre against the surface 22c with a member 28 of a relatively soft material such as rubber so that the fibre assumes the shape of the surface 22c and arranging the optical system so that the angle between the exciting light beam for any particular mode and the undulating fibre axis is substantially constant at all points in the region of launch.

The use of an undulating surface 22c ensures that the light impinging on the fibre is deflected into the optical fibre, the frequency of the undulations being chosen so that it resonates with the fibre mode structure which is in turn determined by the physical dimensions of the optical fibre 15.

Figure 11:

The shape of the optical fibre 23 of FIG. 5 can, as is illustrated in FIG. 11 of the drawings, be modified in order to increase the coupling efficiency by slightly reducing the diameter of the fibre at the point of launch.

It should be noted that the prism 16 of the optical apparatus of FIG. 4 could be used in any one of the arrangements of FIGS. 5 to 10 to replace the prism 22.

Figure 12:
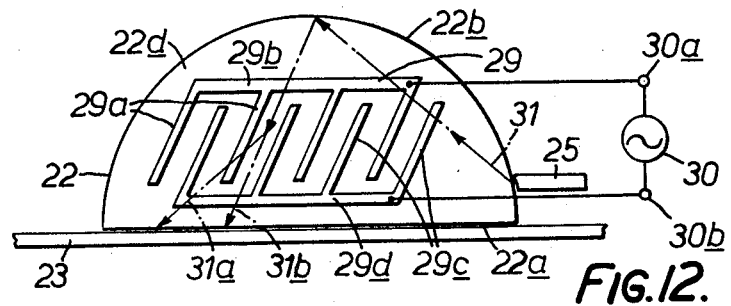
Figure 13:
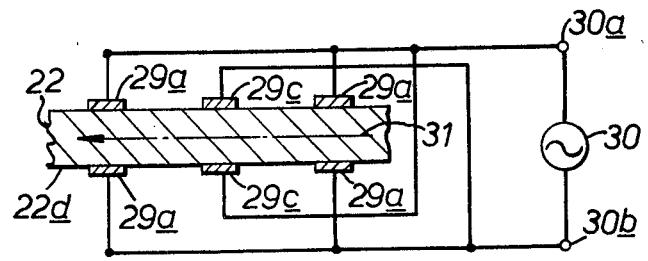

Further alternative arrangements of the optical apparatus according to the invention for use in high speed modulator systems are diagrammatically illustrated in FIGS. 12 and 13 of the drawings.

The optical apparatus illustrated in FIG. 12 of the drawings is basically the same as the optical apparatus according to FIG. 5 of the drawings except that the plate 22 is of an electro-optic material, for example, lithium niobate and an electrode structure 29 is provided on a surface 22d of the plate 22 and is connected to an alternating electrical supply 30 via electrical supply terminals 30a and 30b.

The electrode structure 29 consists of two interlaced rows of electrically conductive finger members, the finger members 29a of one row being coupled together at one end thereof by means of an electrically conductive strip 29b and connected to one side of the supply 30 whilst the finger members 29c of the other row are coupled together at one end thereof by means of an electrically conductive strip 29d and connected to the other side of the supply 30.

In operation, the application of the alternating electrical supply 30 to the electrode structure 29 changes the optical properties of the plate 22 and a light beam 31 applied to the apparatus in a manner as previously outlined utilizing the optical fibre 25 or the like is caused to deflect to produce a beam 31a and/or a beam 31b. The deflection of the beam 31 alters the angle at which the or each beam 31a, 31b impinges on the fibre 23 and thereby alters the coupling of the light into the fibre 23.

In an alternative arrangement for the optical apparatus according to FIG. 12, an additional electrode structure, identical to the electrode structure 29, could, as is diagrammatically illustrated in an enlarged cross-sectional side elevation in FIG. 13 of the drawings, be formed on the other major surface 22f of the plate 22 so that the electrode structures are in alignment. The corresponding rows of finger members of the electrode structures are connected to opposite sides of the supply 30 in order to produce electric fields across the thickness of the plate 22 i.e. transverse to the beam 31.

It is to be understood that the foregoing description of specific examples of this invention is made by way of example only and is not to be considered as a limitation in its scope.

What is claimed is:

1. An optical apparatus for use in association with an optical fibre having a core member whose cross-sectional boundaries are formed from a set of curves and a cladding member which surrounds the core member and which has a refractive index less than the refractive index of the core member, the apparatus including optical means for examining light radiated at an angle through the cladding member caused by leakage radiation for determining the characteristics of the optical fibre, wherein said optical means includes a prismatic means and optical examining means disposed relative to one face of said prismatic means, said prismatic means includes a container, an optically transparent liquid within said container and through which the optical fibre is passed during its production, at least one wall of the container being of a light transparent material; said optical examining means disposed relative to the said at least one transparent wall of the container for examining the light radiated at an angle through the cladding member; and means adapted to maintain the optical fibre in a parallel relationship with the said at least one transparent wall of the container.

2. An optical apparatus as claimed in claim 1 wherein the optical examining means includes a telescope.

3. An optical apparatus as claimed in claim 1 wherein the prismatic means includes a solid prism having one face thereof in contact with the said at least one transparent wall of the container; and said optical examinig means is situated adjacent to the solid prism for examining the light radiated at an angle through the cladding member.

4. An optical apparatus as claimed in claim 3 wherein the optical examining means is a telescope.

5. An optical apparatus as claimed in claim 1 further comprising a laser means for applying a laser beam to the optical fibre at an angle to the longitudinal axis thereof, the laser beam being adapted to intensify the light radiated at the said angle through the cladding member.

6. An optical apparatus for use in association with an optical fibre having a core member whose cross-sectional boundaries are formed from a set of curves and a cladding member which surrounds the core member and which has a refractive index less than the refractive index of the core member, the apparatus including optical illumination means for applying an illuminating beam of light at an angle through the cladding member and for exciting a single mode of leakage radiation, and illumination means including means for maintaining the angle between the light and the fibre axis substantially constant, said illumination means comprises a prism having one face thereof secured to a length of optical fibre, light generation means disposed relative to another surface of the prism and adapted to generate a light beam for application to the optical fibre via the prism, said prism arranged so that the angle at which a generated light beam impinges on the optical fibre at any point along the length thereof is substantially constant, wherein the said one face of the prism is a concave surface, the optical fibre being curved along that portion of the length thereof which is secured to the concave surface.

7. An optical apparatus for use in association with an optical fibre having a core member whose cross-sectional boundaries are formed from a set of curves and a cladding member which surrounds the core member and which has a refractive index less than the refractive index of the core member, the apparatus including optical illumination means for applying an illuminating beam of light at an angle through the cladding member and for exciting a single mode of leakage radiation, and illumination means including means for maintaining the angle between the light and the fibre axis substantially constant, said illumination means comprises a prism having one face thereof secured to a length of optical fibre, light generation means disposed relative to another surface of the prism and adapted to generate a light beam for application to the optical fibre via the prism, said prism arranged so that the angle at which a generated light beam impinges on the optical fibre at any point along the length thereof is substantially constant, wherein the said one face of the prism has a defined undulated surface and wherein that portion of the length of the optical fibre which is secured to the undulated surface is shaped so as to conform to the undulation.

8. An optical apparatus as claimed in claim 7 which includes a member of a relatively soft material for pressing the said portion of the length of optical fibre securely against the undulated surface and causing the optical fibre to approximate the shape of the undulated surface.

9. An optical apparatus for use in association with an optical fibre having a core member whose cross-sectional boundaries are formed from a set of curves and a cladding member which surrounds the core member and which has a refractive index less than the refractive index of the core member, the apparatus including optical illumination means for applying an illuminating beam of light at an angle through the cladding member and for exciting a single mode of leakage radiation, and illumination means including means for maintaining the angle between the light and the fibre axis substantially constant, said illumination means comprises a prism having one face thereof secured to a length of optical fibre, light generation means disposed relative to another surface of the prism and adapted to generate a light beam for application to the optical fibre via the prism, said prism arranged so that the angle at which a generated light beam impinges on the optical fibre at any point along the length thereof is substantially constant, wherein the prism is a plate of an electro-optic material to an edge of which the length of optical fibre is secured and wherein the apparatus includes at least one electrode structure which is secured to a major surface of the electro-optic plate and which consists of two interlace rows of electrically conductive finger members, the finger members of each row being coupled together at one end thereof; and two electrical supply terminals which are each connected to a separate one of the rows of finger members.

10. An optical apparatus as claimed in claim 9 which includes two of the said electrode structures each one of which is secured to a separate one of the major surfaces of the electro-optic plate, wherein the electrode structures are in alignment and wherein the corresponding rows of finger members of the electrode structures are connected to separate ones of the electrical supply terminals.

11. A method of producing an optical fibre having a core member and a cladding member which surrounds the core member and which has a refractive index less than the refractive index of the core member, the method including the steps of subjecting the optical fibre to a drawing operation to reduce the cross-sectional area thereof; propagating light along the optical fibre during drawing; passing the optical fibre, after the drawing operation, through an optically transparent liquid contained in a container having at least one wall of a light transparent material, the optical fibre being maintained in a parallel relationship with the said at least one transparent wall of the container; and examining the light radiated at an angle through the cladding member and thereby determining the characteristics of the optical fibre.

12. A method as claimed in claim 11 wherein the method includes an additional step of applying a beam of light to the optical fibre at an angle to the longitudinal axis thereof while passing the fibre through the liquid.

* * * * *